United States Patent
Haughney et al.

[11] Patent Number: 5,499,612
[45] Date of Patent: Mar. 19, 1996

[54] DUAL-FUNCTION CLAMPING ASSEMBLY ADAPTED FOR A HYDRAULICALLY-ACTUATED FUEL INJECTOR

[75] Inventors: Michael A. Haughney, Peoria; Mehrdad Mojarrad, Chillicothe; Devin C. Tornow, Peoria; Norval J. Wiemken, Dwight, all of Ill.

[73] Assignee: Caterpillar Inc., Peoria, Ill.

[21] Appl. No.: 316,758

[22] Filed: Oct. 3, 1994

[51] Int. Cl.⁶ .................................................. F02M 37/04
[52] U.S. Cl. .................................. 123/470; 123/509
[58] Field of Search .................................. 123/470, 509, 123/446, 495, 472, 456

[56] References Cited

U.S. PATENT DOCUMENTS

| | | | |
|---|---|---|---|
| 1,379,811 | 5/1921 | Fyffe. | |
| 3,233,921 | 2/1966 | Holmgren et al. | 285/110 |
| 3,332,709 | 7/1967 | Kowalski | 285/23 |
| 3,752,509 | 8/1973 | Stafford | 285/334.4 |
| 4,025,092 | 5/1977 | Wakefield | 285/94 |
| 4,097,071 | 6/1978 | Crawford et al. | 285/94 |
| 4,206,725 | 6/1980 | Jenkel et al. | 123/32 R |
| 4,485,790 | 12/1984 | Nishimura | 123/470 |
| 4,527,738 | 7/1985 | Martin | 239/90 |
| 4,561,680 | 12/1985 | Gerber | 285/98 |
| 4,938,193 | 7/1990 | Rauffisen | 123/470 |
| 5,121,730 | 6/1992 | Ausman et al. | 123/467 |
| 5,174,612 | 12/1992 | Schnell | 285/49 |
| 5,297,523 | 3/1994 | Hafner et al. | 123/456 |
| 5,325,834 | 7/1994 | Ballheimer | 123/470 |
| 5,419,298 | 5/1995 | Nolte | 123/509 |

FOREIGN PATENT DOCUMENTS

| | | | |
|---|---|---|---|
| 541802 | 12/1931 | Germany | 123/470 |
| 113425 | 1/1926 | Switzerland | 123/470 |
| 448089 | 6/1936 | United Kingdom | 123/470 |
| 2023229 | 12/1979 | United Kingdom | 123/470 |
| 1593491 | 7/1981 | United Kingdom | 123/470 |

OTHER PUBLICATIONS

Article–Pproduct and Design Data, Section III Tube End Fittings, Formite Tube Company, pp. 1–50.

*Primary Examiner*—Carl S. Miller
*Attorney, Agent, or Firm*—Anthony N. Woloch

[57] ABSTRACT

A dual-function clamping assembly adapted for i) connecting a hydraulically-actuated injector to an engine member, such as a cylinder head, and ii) for sealedly connecting an actuating fluid supply passage between the engine member and an actuating fluid inlet passage of the injector located at one end portion of the injector. The clamp assembly is applicable, for example, for angled-body injectors having the actuator and valve assembly positioned offset from and angled relative to the main longitudinal axis of the injector body.

5 Claims, 5 Drawing Sheets

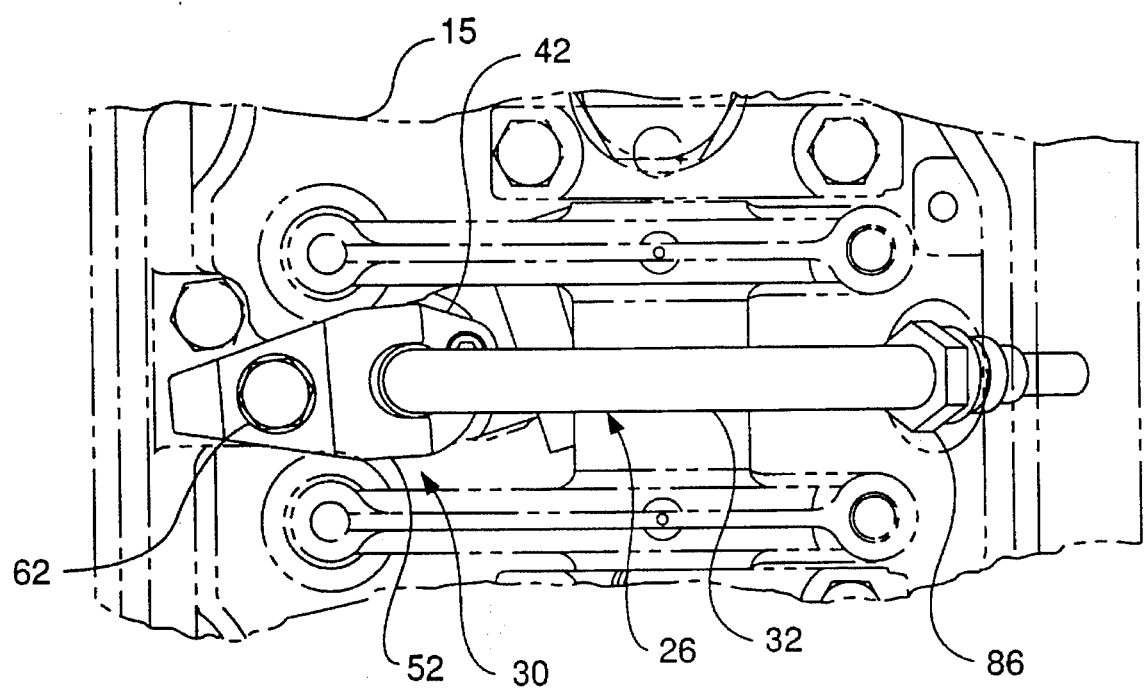

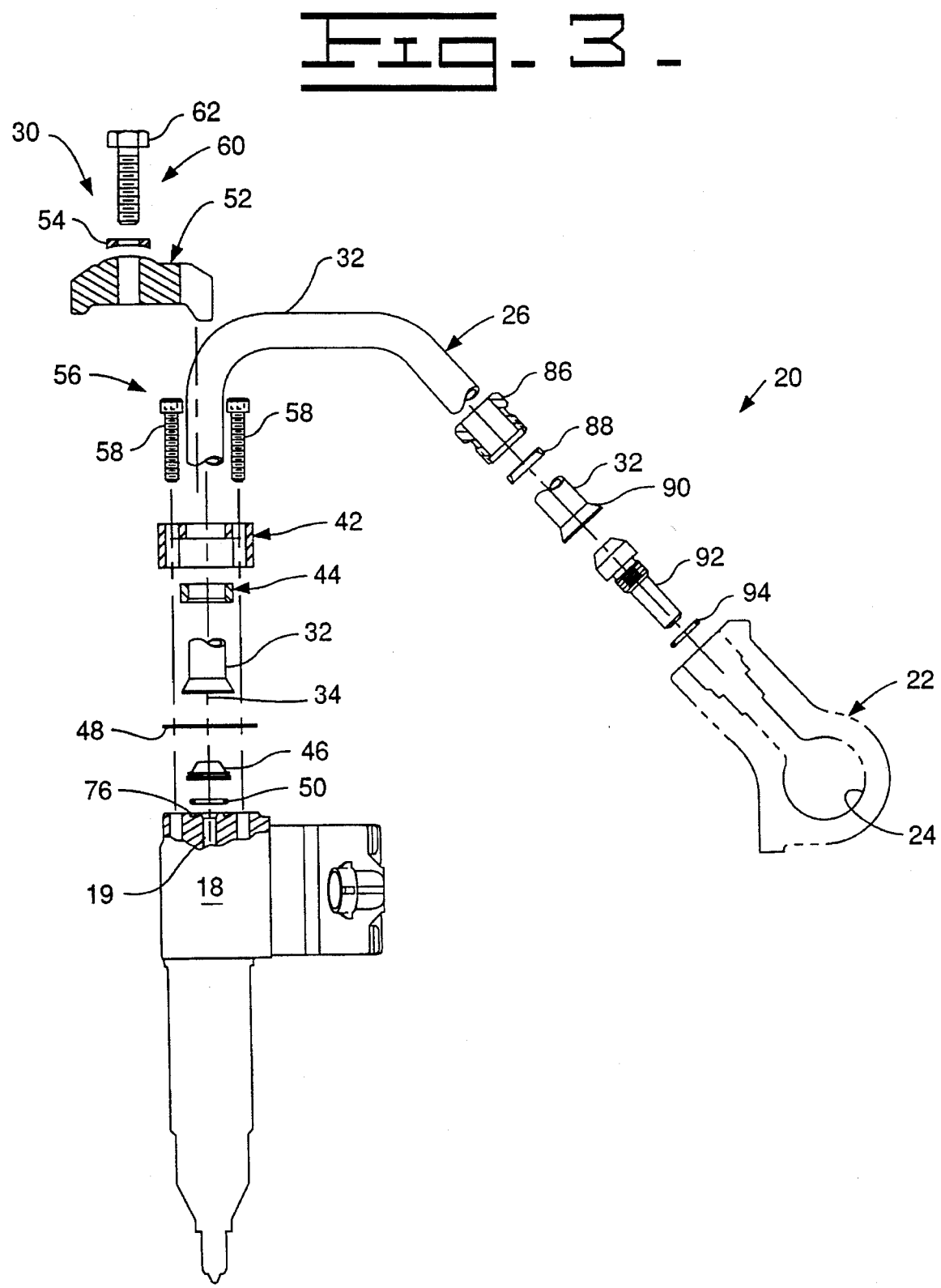

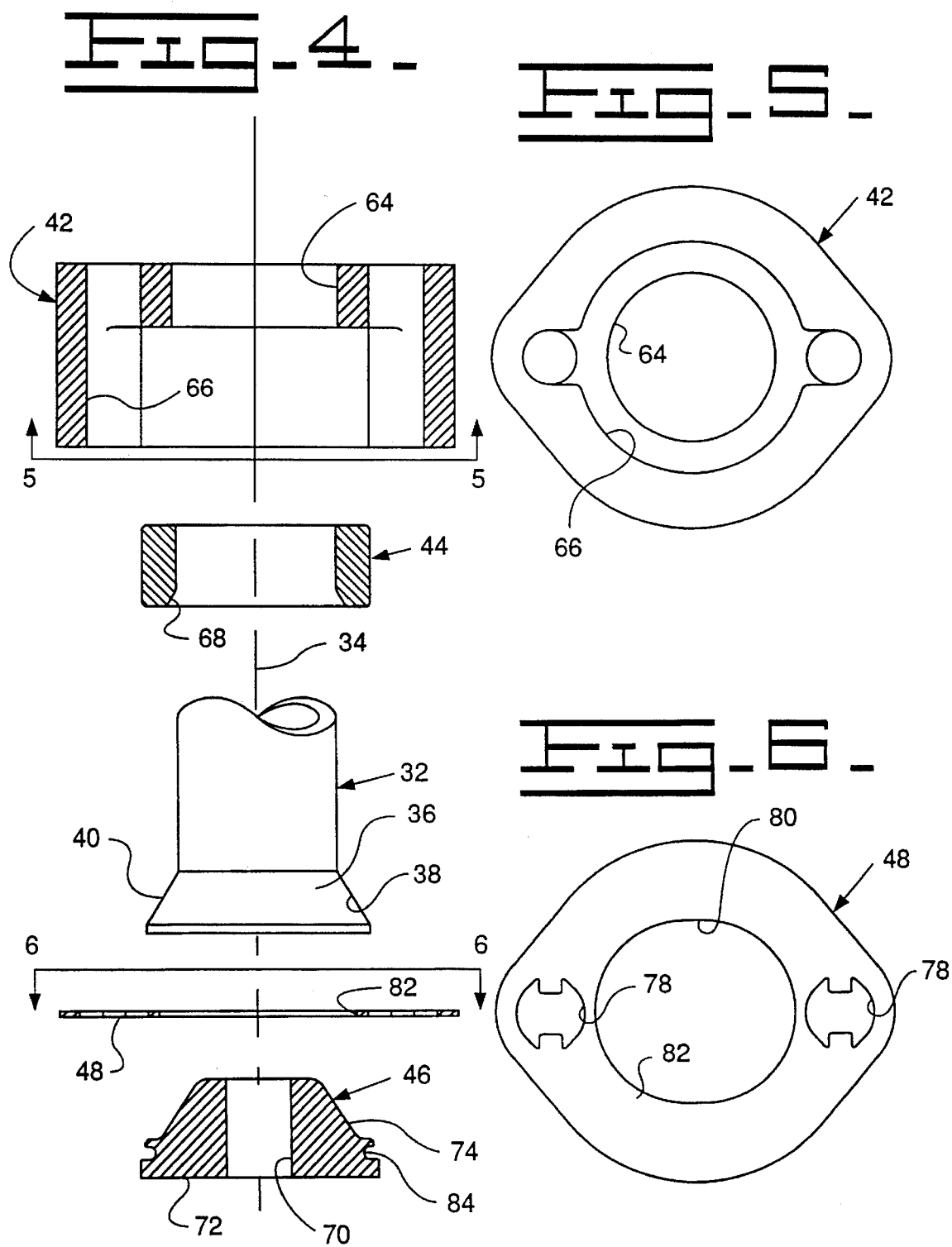

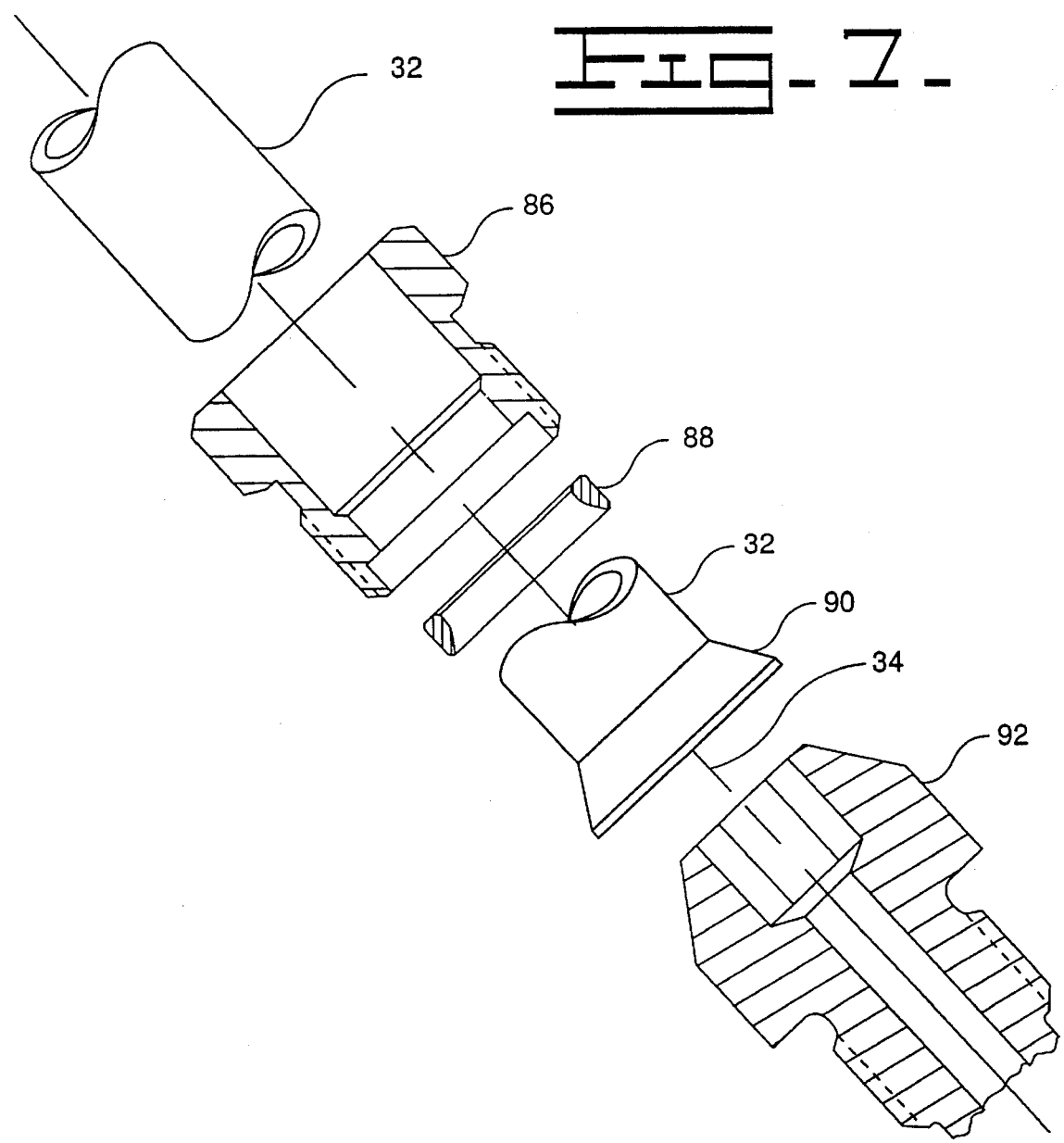

5,499,612

DUAL-FUNCTION CLAMPING ASSEMBLY ADAPTED FOR A HYDRAULICALLY-ACTUATED FUEL INJECTOR

TECHNICAL FIELD

The present invention relates generally to fuel injectors and, more particularly to clamping assemblies adapted for connecting a hydraulically-actuated fuel injector to an engine member, such as a cylinder head.

BACKGROUND ART

Hydraulically-actuated fuel injection systems and/or components thereof are shown, for example, in U.S. Pat. No. 5,121,730 issued to Ausman et al. on Jun. 16, 1992 and U.S. Pat. No. 5,297,523 issued to Hafner et al. on Mar. 29, 1994. In such fuel injection systems, the actuating fluid is communicated to an actuating fluid inlet port(s) of each injector via a common rail passage and a respective rail branch passage internally defined in an engine member, such as a cylinder head. Moreover, each injector must be releasably connected to the engine member.

In the embodiment shown in FIGS. 2, 4, 7, and 8 of Ausman et al., a clamp is connected by one or more bolts to the engine member. The clamp also contacts a pair of shoulders formed on the injector body in order to apply a clamping load thereto after the injector is installed in an engine member bore. In this embodiment, the actuating fluid inlet port(s) of each injector is located between the opposite end portions of the injector. In the embodiment illustrated in FIG. 2 of Hafner et al., the actuating fluid inlet of each injector is located at one end portion of the injector. Due to space constraints, a relatively short length and rigid external fluid line supplies actuating fluid from an actuating fluid manifold to a respective fuel injector. The connection between the external actuating fluid line and the actuating fluid inlet port of the injector can experience high pressure fluid leakage problems if the mating components turn out to be misaligned during manufacturing and assembly.

Other clamping assemblies for simply connecting a fuel injector to an engine member are shown, for example, in U.S. Pat. No. 4,206,725 issued to Jenkel et al. on Jun. 10, 1980 and U.S. Pat. No. 4,527,738 issued to Martin on Jul. 9, 1985.

The present invention is directed to overcoming one or more of the problems as set forth above.

DISCLOSURE OF THE INVENTION

In one aspect of the present invention, a dual-function clamping assembly is disclosed and adapted for a hydraulically-actuated fuel injector positioned in an engine member. The clamping assembly comprises releasable connecting means both for sealedly and releasably connecting an external actuating fluid supply line to an actuating fluid inlet port of the injector and also for releasably connecting said injector to the engine member.

The present invention is particularly desirable for hydraulically-actuated fuel injection system applications where space within an engine is very limited and misalignment of fluid tight connections must be accommodated.

BRIEF DESCRIPTION OF THE DRAWINGS

FIG. 2 is a diagrammatic enlarged plan view taken along line 2—2 of FIG. 1.

FIG. 3 is a diagrammatic enlarged exploded partial cross-sectional view of some of the components shown in FIG. 1, including the clamping assembly.

FIG. 4 is a diagrammatic further enlarged exploded partial cross-sectional view of some of the components of the clamping assembly shown in FIG. 3 adapted to be connected to an actuating fluid inlet port of a hydraulically-actuated fuel injector.

FIG. 5 is a diagrammatic end view of a flange taken along line 5—5 of FIG. 4.

FIG. 6 is a diagrammatic end view of an optional retaining plate taken along line 6—6 of FIG. 4.

FIG. 7 is a diagrammatic further enlarged exploded partial cross-sectional view of some of the components shown in FIG. 3 adapted to be connected to an actuating fluid manifold.

BEST MODE FOR CARRYING OUT THE INVENTION

Figure 1:
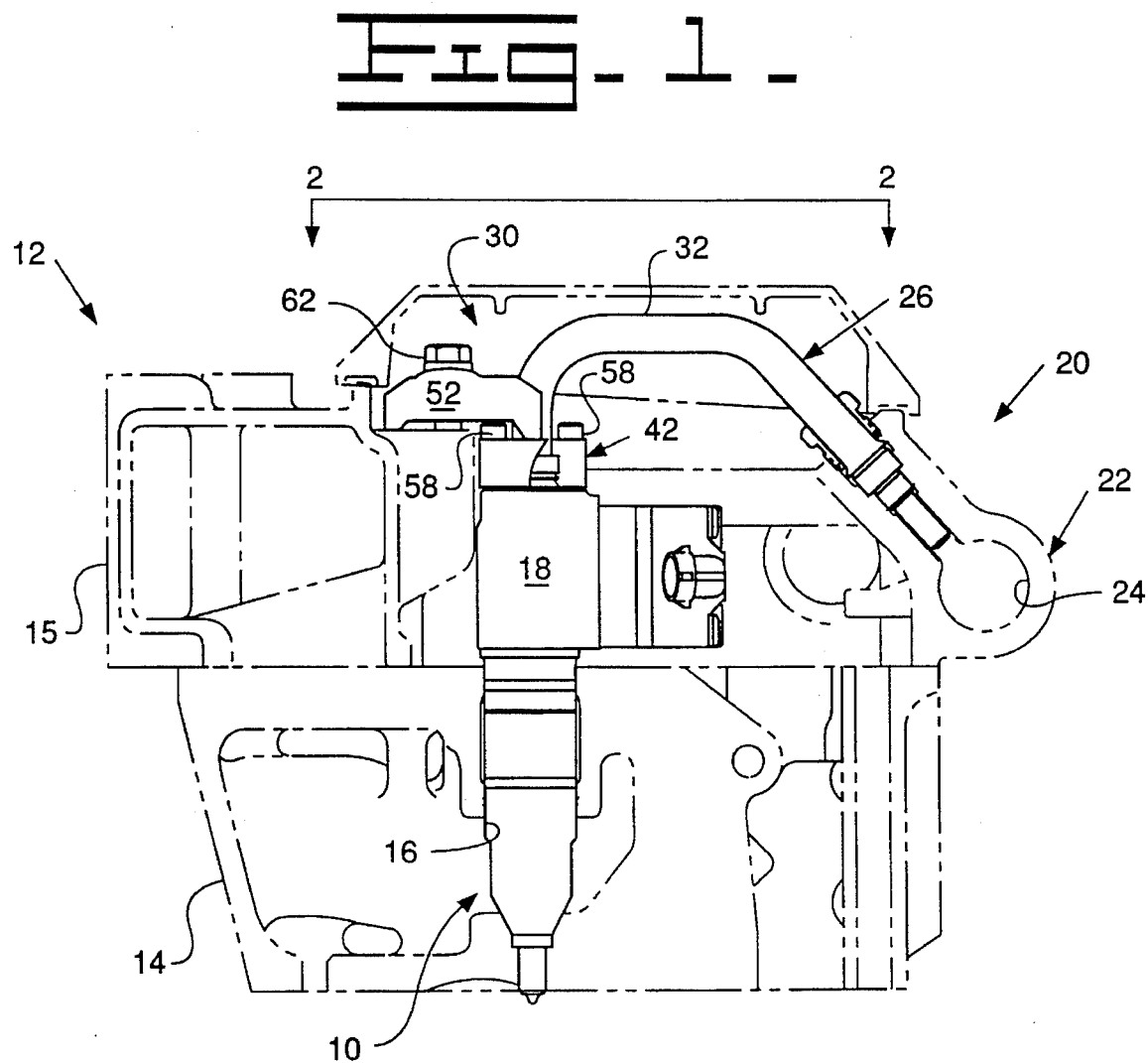
FIG. 1 is a diagrammatic partial cross-sectional view of a first embodiment of a hydraulically-actuated electronically-controlled fuel injector as installed in an exemplary direct-injection internal combustion engine.

Referring to FIG. 1, wherein similar reference numerals designate similar elements or features throughout FIGS. 1–7, there is shown an embodiment of a hydraulically-actuated electronically-controlled fuel injection system 10 (hereinafter referred to as a HEUI fuel system).

The exemplary HEUI fuel system 10 is shown in FIG. 1 as adapted for a direct-injection diesel-cycle internal combustion engine 12. While that type of engine is shown, it should be understood that the present invention is also applicable to other types of engines, such as vee-type engines and rotary engines, and that the engine may contain one or more cylinders or combustion chambers. The engine 12 has at least one engine member 14, such as a cylinder head, and an air intake manifold 15 or valve cover base. Each cylinder head 14 defines one or more injector bores 16.

Referring again to FIG. 1, The HEUI fuel system 10 includes one or more hydraulically-actuated electronically-controlled injectors 18, such as unit pump-injectors, adapted to be positioned in a respective bore 16. Each injector 18 has an actuating fluid inlet port 19 located at one end portion of the injector. The system 10 further includes apparatus or means 20 for supplying hydraulically actuating fluid to one end portion of each injector 18. Further details of an exemplary HEUI fuel system 10, not discussed here, are disclosed in U.S. Pat. No. 5,168,855 issued to Stone on Dec. 8, 1992.

Preferably, the fluid chosen for the actuating fluid is not fuel but is a relatively incompressible liquid having a relatively higher viscosity than fuel under the same conditions. Preferably, the actuating fluid is engine lubricating oil supplied from an engine lubrication oil sump (not shown).

Preferably, the actuating fluid supplying means 20 includes an actuating fluid manifold 22 associated with the valve cover base 15 mounted over each cylinder head 14 having a bank of injectors 18. Each actuating fluid manifold 22 has one common rail passage 24 and a plurality of mutually spaced rail branch passages 26 in the form of external fluid supply lines extending from the common rail passage 24 generally to the respective actuating fluid inlet port 19 of an injector 18.

The actuating fluid supplying means 20 further includes a dual-function clamping assembly 30. The clamping assembly 30 is provided and adapted for each hydraulically-actuated fuel injector 18 positioned in a respective engine member 14. The clamping assembly 30 includes a relatively rigid and non-linear external actuating fluid line 32, such as seamless tubing, having a centerline axis 34 and a flared end portion 36. The flared end portion 36 defines an annular internal sealing surface 38 and an annular external abutment surface 40. Preferably, the annular internal sealing surface 38 of the fluid line 32 is frusto-conically shaped. For example, the annular internal sealing surface 38 may be tapered about 37° relative to the local centerline axis 34 of the fluid line 32. Preferably, the annular external abutment surface 40 is frusto-conically shaped. For example, the annular external abutment surface 40 may be tapered about 33° relative to the local centerline axis 34 of the fluid line 32.

The clamping assembly 30 further includes a flange 42, a first sleeve 44, a seat 46, an optional retaining plate 48, a first flexible annular sealing member 50 such as an elastomeric o-ring, a clamp 52, an optional washer 54, a first releasable connecting means 56 such as one or more threaded bolts 58 for releasably connecting the flange 42 to the respective injector 18, and second releasable connecting means 60 such as threaded bolt 62 for releasably connecting the clamp 52 to the engine member 14.

The flange 42 defines a main through bore 64 and an enlarged counterbore 66 defining an annular shoulder and facing said flared end portion 36. The fluid line 32 extends through the bore 64 by a predetermined loose clearance. The first sleeve 44 is loosely positioned in the counterbore 66 of the flange 42 and has an annular internal surface 68 adapted to sealedly contact said annular external surface 40 of the fluid line 32.

The seat 46 defines a bore 70 therethrough. Moreover, the seat 46 has a relatively flat first end portion 72 and an oppositely-facing annular second end portion 74. The first end portion 72 of the seat 46 is adapted to sealedly seat around the actuating fluid inlet port 19 of the respective injector 18. The second end portion 74 of the seat 46 is adapted to sealedly seat against the annular internal sealing surface 38 of the fluid line 32. Preferably, the annular second end portion 74 of the seat 46 is frusto-conical or semi-spherically shaped. For example, the annular second end portion 74 may be tapered about 34° or about 37° relative to the local centerline axis 34 of seat 46.

The first sealing member 50 is positioned in an annular groove 76 defined in one or both of the seat 46 or a body of the injector 18. The optional retaining plate 48 is provided as a means for holding the seat 46 to the fluid line 32 during assembly to an injector 18. The relatively thin and flexible retaining plate 48 has one or more holes 78, offset from the local centerline axis 34, through which the bolt(s) 58 extend and loosely grip. The retaining plate 48 also has a central hole 80 defined by an internal annular edge 82. The annular edge 82 is adapted to engage and grip a circumferential annular groove 84 defined in the second end portion 74 of the seat 46.

As shown in FIG. 7, the actuating fluid supplying means 20 further includes a nut 86, a second sleeve 88, another flared end portion 90 of the fluid line 32, a fitting 92 adapted to connect the fluid line with the common rail passage 24 of the manifold 22, and a second flexible annular sealing member 94 such as an o-ring.

Industrial Applicability

The clamping assembly 30 of the present invention provides a dual function of positively securing each injector 18 to the engine member 14 while simultaneously providing a fluid tight connection between a respective external fluid supply line 32 and the injector 18. The clamping assembly 30 is particularly advantageous for accommodating misalignment of the injector actuating fluid inlet port 19 and the respective external actuating fluid line 32 during assembly.

The seat 46 is sealedly movable relative to the flared end portion 36 of the fluid line 32. Thus, the relatively flat first end portion 72 of the seat 46 can somewhat freely move in two dimensions relative to the actuating fluid inlet port 19 of the injector 18 to accommodate misalignment while maintaining a fluid-tight connection. The annular clearance between the flange 42 and the fluid line 32 provided by the flange bore 64 also allows relative angular movement therebetween to also accommodate angular misalignment while maintaining a fluid-tight connection. This arrangement has proven to be satisfactory even with relatively low torques applied to the bolts 58, 62.

Other aspects, objects, and advantages of this invention can be obtained from a study of the drawings, the disclosure, and the appended claims.

We claim:

1. A dual-function clamping assembly adapted for a hydraulically-actuated fuel injector positioned in an engine member, said injector having an actuating fluid inlet port located at one end portion of the injector, said clamping assembly comprising:

an external actuating fluid line having a centerline axis and a flared end portion defining an annular internal sealing surface and an annular external sealing surface;

a flange defining a main bore through which said fluid line loosely extends and a counterbore facing said flared end portion;

a sleeve positioned in the counterbore of the flange and having an annular internal surface adapted to sealedly contact said annular external surface of the fluid line; and a seat defining a bore therethrough, said seat having a relatively flat first end portion and an annular second end portion, said first end portion of the seat adapted to sealedly seat around the actuating fluid inlet port of the injector, said second end portion of the seat adapted to sealedly seat against the annular internal sealing surface of the fluid line;

first connecting means for connecting the flange to the injector and second connecting means for connecting the flange to the engine member.

2. The clamping assembly of claim 1 wherein said annular internal sealing surface is frusto-conical.

3. The clamping assembly of claim 2 wherein said annular internal sealing surface is tapered about 37° relative to the centerline axis of the fluid line.

4. The clamping assembly of claim 1 wherein said annular external sealing surface is frusto-conical.

5. The clamping assembly of claim 4 wherein said annular external sealing surface is tapered about 33° relative to the centerline axis of the fluid line.

* * * * *